C. LAGERGREN.
AUTOMOBILE FRONT AXLE.
APPLICATION FILED FEB. 23, 1912.
1,064,496.
Patented June 10, 1913.
2 SHEETS—SHEET 1.
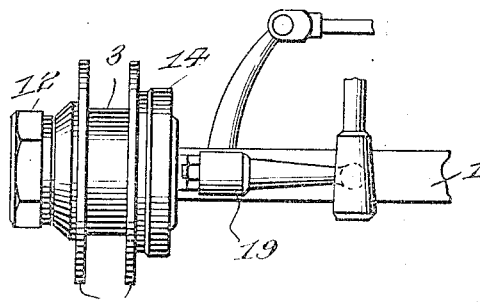
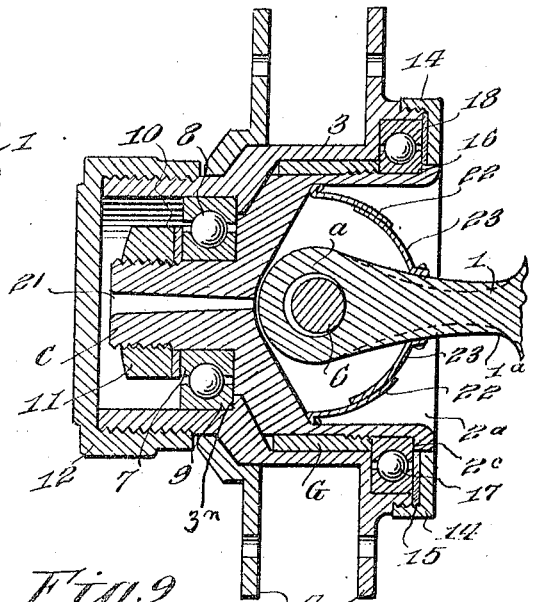
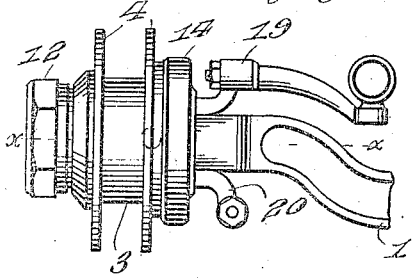
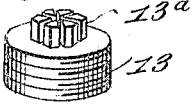
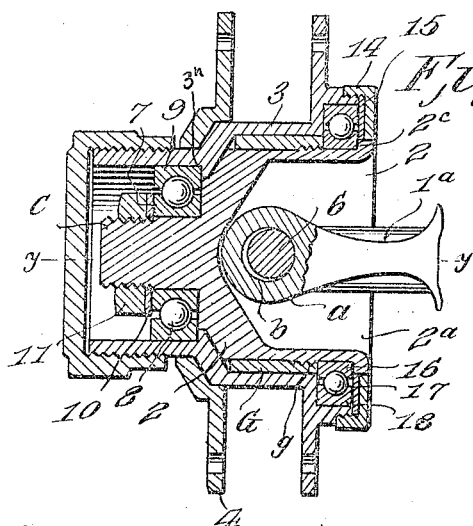
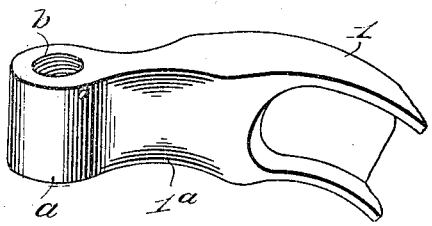
Witnesses
Frank Hough
V. B. Hillyard
Inventor
Carl Lagergren,
By Victor J. Evans
Attorney

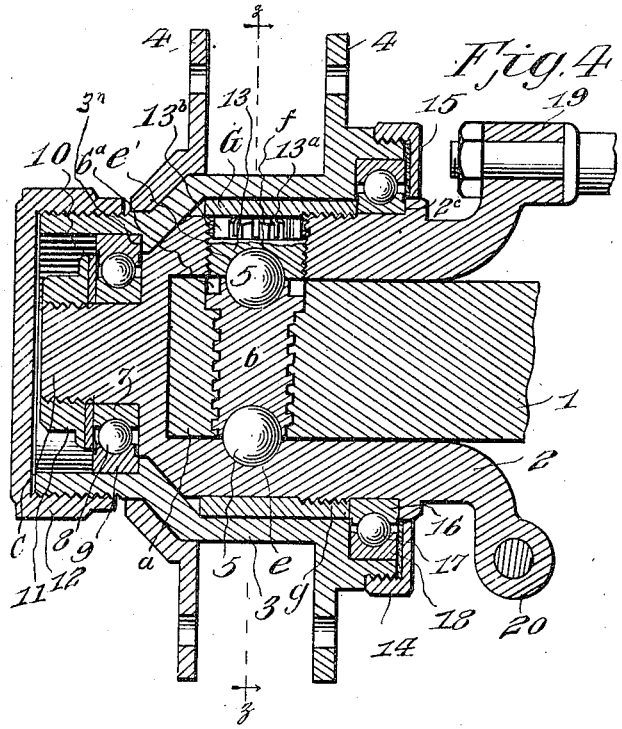

UNITED STATES PATENT OFFICE.

CARL LAGERGREN, OF OSTERVILLE, MASSACHUSETTS.

AUTOMOBILE FRONT AXLE.

1,064,496.    Specification of Letters Patent.    Patented June 10, 1913.

Application filed February 23, 1912.    Serial No. 679,325.

*To all whom it may concern:*

Be it known that I, CARL LAGERGREN, a citizen of the United States, residing at Osterville, in the county of Barnstable and State of Massachusetts, have invented new and useful Improvements in Automobile Front Axles, of which the following is a specification.

The primary purpose of this invention is the provision of a front axle for automobiles, although it may be advantageously applied to the axle of any vehicle provided with steering wheels, since the nature of the invention is to facilitate the turning of the steering wheels and to guard against the side thrust and to insure the wheels tracking in a straight line.

The primary purpose of the invention is to mount the steering wheel upon the axle in such a manner as to have the axis about which the wheel turns when swung from right to left about or in the plane of the center of the wheel or in vertical line with the point of contact of the wheel with the ground or supporting surface, thereby enabling the steering of the wheel to be accomplished with the expenditure of a minimum amount of force while at the same time overcoming the tendency to side stress and enabling the wheel to follow in a straight line when the vehicle is in motion.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of an end portion of a front axle and the hub of a steering wheel embodying the invention. Fig. 2 is a front view of the parts illustrated in Fig. 1. Fig. 3 is a horizontal section on the line $x$—$x$ of Fig. 2, showing the parts on a larger scale. Fig. 4 is a vertical section on the line $y$—$y$ of Fig. 3. Fig. 5 is a section on the line $z$—$z$ of Fig. 4. Fig. 6 is a front view of the wheel bearing. Fig. 7 is a modification. Fig. 8 is a further modification. Fig. 9 is a perspective view of the plug for closing the opening in the wheel bearing through which the pivot stud is passed. Fig. 10 is a detail perspective view of a portion of the axle.

Corresponding and like parts are referred to in the following description, and indicated in all the views of the drawings, by the same reference characters.

The axle is indicated at 1 and may be of any type, either straight or drop according to the nature of the vehicle for which designed. Each end of the axle terminates in a sleeve $a$ in which the opening $b$ extends vertically and is internally threaded. The sides of the axle near the sleeve are contracted, as indicated at $1^a$, to provide ample clearance for the wheel bearing 2 which is mounted on the end of the axle so as to turn about a vertical axis which coincides with the center of the opening $b$. The wheel bearing 2 is hollow and fits upon the extremity of the axle. The opening $2^a$ formed in the inner end of the wheel bearing 2 is horizontally elongated to admit of angular turning of the wheel for purposes of steering. The outer portion of the wheel bearing is reduced to provide an extension $c$ which is threaded to receive a nut 11. A pivot stud 6 is fitted into the opening $b$ and its ends are formed with rounded depressions $d$ in which are fitted balls 5. The pivot stud 6 is threaded into the opening $b$ to prevent vertical movement and to allow of adjustment. The wheel bearing 2 has a rounded depression $e$ to receive the lower ball 5 and has an opening $e'$ at a point diametrically opposite the depression $e$ to receive a plug 13 in which is formed a rounded depression $f$ to receive the upper ball 5.

When assembling the parts the wheel bearing 2 is slipped upon the end of the axle, with the depression $e$ and opening $e'$ thereof in line with the opening $b$ of the axle, after which the lower ball 5, pivot stud 6 and upper ball 5 are placed in position, after which the plug 13 is screwed into the opening $e'$ and adjusted to prevent undue play of the upper ball 5, thereby locking the wheel bearing to the axle. The lower ball 5 sustains the load, hence the necessity for fixing the position of the pivot stud 6 against vertical movement. The pivot stud is threaded and has a head notched in its sides, at $6^a$, to receive a tool to admit of turning and to receive a lock screw $6^b$ to secure the pivot stud in the adjusted position. The plug 13 has a projection $13^a$ in which are formed intersecting grooves to receive a lock pin $13^b$ to secure the plug in the adjusted position. A band G encircles the wheel bearing and is threaded thereto, at $g$, and serves to retain the lock pin $13^b$ in place and to strengthen the wheel bearing. The wheel bearing is formed with two lugs 19 and 20, the lug 19 receiving the steering rod, whereas the lug 20 receives the rod which connects the two wheel bearings.

The hub of the wheel is indicated at 3 and is slipped upon the wheel bearing and may be of any construction.

The numeral 4 designates the hub flange. Anti-friction bearings are interposed between the ends of the hub 3 and the wheel bearing, said anti-friction bearings being of a size and construction adapted to the particular use and location for which designed. The outer anti-friction bearing comprises rings 7 and 9 with interposed anti-friction devices 8 and is mounted upon the extension $c$, being retained in place by means of a washer 10 and the nut 11. This outer anti-friction bearing also serves to hold the wheel upon the wheel bearing 2, since it engages an inner shoulder $3^n$ of the hub 3. A hub cap 12 threaded upon the outer end of the hub 3 incloses the nut 11 and the outer anti-friction bearing. The inner anti-friction bearing comprises rings 16 and 18 with interposed anti-friction devices 17 and is mounted upon the inner portion of the wheel bearing 2 and engages a shoulder $2^c$ thereof and prevents inward movement of the hub 3. A cap ring 14 threaded upon the inner end of the hub 3 retains the inner anti-friction bearing in place. A felt washer 15 interposed between the vertical flange of the retaining cap ring 14 and the adjacent end of the inner anti-friction bearing prevents the escape of oil and excludes dust.

It will be observed that the balls 5 serve to lock the wheel bearing upon the axle as well as to form pivot points for said wheel bearing to turn upon when moving the wheel laterally to guide the vehicle either to the right or to the left. It is further noted that the balls 5 are in the plane of the wheel and about in line with the point of contact between the wheel and the ground or supporting surface, hence but very little force is required to be expended for turning the wheel either to the right or to the left when steering the machine. The tendency of side stress is likewise reduced to the smallest amount because of the centralization of the steering axis of the wheel. The term steering axis is used to designate the vertical line about which the wheel turns when moved to the right or to the left for directing the vehicle in the desired course of travel.

In the modification shown in Fig. 8 the wheel bearing has an axle opening 21 which is formed in the extension $c$ and leads into the space $2^a$. This opening admits of lubricant being forced to the pivot connections between the wheel bearing and axle, the hub cap 12 being used as means for compressing the lubricant so as to force the same through the opening 21 and also to the outer anti-friction bearing. Dust and other foreign matter is excluded from the pivot connections between the wheel bearing and axle by means of a guard, the latter also serving to prevent the waste of lubricant. The guard comprises a pair of plates 22 and 23. The plates 22 are secured to the wheel bearing and the plates 23 are made fast to the sides of the axle. The two plates of each pair are curved concentric with the pivot stud 6 and overlap, thereby maintaining a close fit at all positions of the wheel.

While it is preferred to have the axis of the pivot connections between the wheel bearing and axle arranged vertically, nevertheless it has been found that under some conditions it is advantageous to have the axis inclined to the vertical, but in a plane parallel with the plane of the wheel. This arrangement is indicated in Fig. 7. It has been found that by having the axis inclined to the vertical the wheel is more tractable, particularly when making curves and also to cause the wheel to run in a straight line without any tendency to swerve either to the right or to the left.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination an axle, a wheel bearing mounted upon the axle and adapted to turn to the right or left, a ball above and a ball below the axle in line with the steering axis and forming interlocking means between the axle and wheel bearing.

2. In combination an axle having a vertical opening near its outer end, a wheel bearing mounted upon the axle to turn laterally thereon about a vertical axis, said wheel bearing having a depression and an opening at diametrically opposite points and arranged in line with the vertical opening of the axle, pivot connecting means let into the vertical opening of the axle and projecting to engage the wheel bearing, and a plug threaded into the opening of the wheel bearing and engaging the pivot connecting means between the wheel bearing and axle.

3. In combination an axle having a vertical opening near its end, a wheel bearing mounted upon the axle and having a depression and threaded opening at diametrically opposite points in line with the vertical opening of the axle, a stud let into the vertical opening of the axle and having depressions in its ends, balls seated in the depressions in the ends of the stud and projecting beyond the sides of the axle, the lower ball entering the depression of the wheel bearing, and a plug threaded into the opening of the wheel bearing and having a depression to receive the projecting portion of the upper ball.

4. In combination an axle having a vertical opening near its end, a wheel bearing mounted upon the axle and having a depression in the upper side of its lower portion, and an opening in its upper portion, said depression and opening being in line with the vertical opening of the axle, a pivot stud adjustable in the vertical opening of the axle, means for securing said pivot stud to the axle in the adjusted position, a ball confined between the lower end of the pivot stud and the depression of the wheel bearing, a second ball mounted upon the pivot stud, and a plug fitted in the opening in the upper portion of the wheel bearing and confining said second ball upon the pivot stud.

5. In combination an axle having a vertical opening near its end, a wheel bearing having an opening and a depression in its upper and lower portions in line with the vertical opening of the axle, a pivot stud threaded in the vertical opening of the axle, means for securing the pivot stud in an adjusted position, a ball confined between the lower end of the pivot stud and the depression formed in the lower portion of the wheel bearing, a plug threaded into the opening in the upper portion of the wheel bearing, a second ball confined between said plug and the upper end of said pivot stud, and means for securing the plug in the adjusted position.

In testimony whereof I affix my signature in presence of two witnesses.

CARL LAGERGREN.

Witnesses:
V. B. HILLYARD,
BENNETT S. JONES.